United States Patent
Gallup et al.

[11] Patent Number: 5,979,556
[45] Date of Patent: Nov. 9, 1999

[54] SLOW ACIDIZING OF GEOLOGICAL FORMATIONS

[75] Inventors: Darrell L. Gallup, Santa Rosa, Calif.; Tim G. Rossknecht, Jakarta, Indonesia

[73] Assignee: Union Oil Company of California, El Segundo, Calif.

[21] Appl. No.: 08/687,748

[22] Filed: Jul. 25, 1996

[51] Int. Cl.⁶ .................................................. E21B 43/27
[52] U.S. Cl. .......................................... 166/275; 166/307
[58] Field of Search ................................... 166/275, 307, 166/278, 300, 308, 250.01

[56] References Cited

U.S. PATENT DOCUMENTS

| | | | |
|---|---|---|---|
| 2,863,832 | 12/1958 | Perrine et al. | 252/8.55 |
| 3,251,415 | 5/1966 | Bomhardieri et al. | 166/307 |
| 3,441,085 | 4/1969 | Gidley | 166/307 |
| 3,953,340 | 4/1976 | Templeton et al. | 166/307 X |
| 4,454,914 | 6/1984 | Watanabe | 166/244 |
| 4,476,930 | 10/1984 | Watanabe | 166/279 |
| 4,480,694 | 11/1984 | Watanabe | 166/300 |
| 4,500,434 | 2/1985 | Jost et al. | 210/696 |
| 4,548,732 | 10/1985 | Scheuerman et al. | 166/307 X |
| 4,993,442 | 2/1991 | Young | 134/22.14 |
| 5,054,556 | 10/1991 | Greitzer et al. | 166/302 |
| 5,082,058 | 1/1992 | Blumen | 166/307 X |
| 5,168,930 | 12/1992 | Wiseman et al. | 166/307 X |
| 5,190,664 | 3/1993 | Gallup et al. | 210/696 |
| 5,203,413 | 4/1993 | Zerhboub | 166/307 X |
| 5,372,194 | 12/1994 | Greitzer et al. | 166/302 |
| 5,529,125 | 6/1996 | Di Lullo Arias et al. | 166/307 |

*Primary Examiner*—Frank Tsay
*Attorney, Agent, or Firm*—Shlomo R. Frieman; Alan H. Thompson; Gregory P. Wirzbicki

[57] ABSTRACT

A method for continuously acidizing a geological rock formation for at least 3 months comprising adding a dilute acid to a geothermal carrier fluid in a concentration less than 0.1 weight percent to produce an acidified fluid and continuously contacting the rock formation with the acidified fluid until the permeability of the formation is increased.

36 Claims, 1 Drawing Sheet

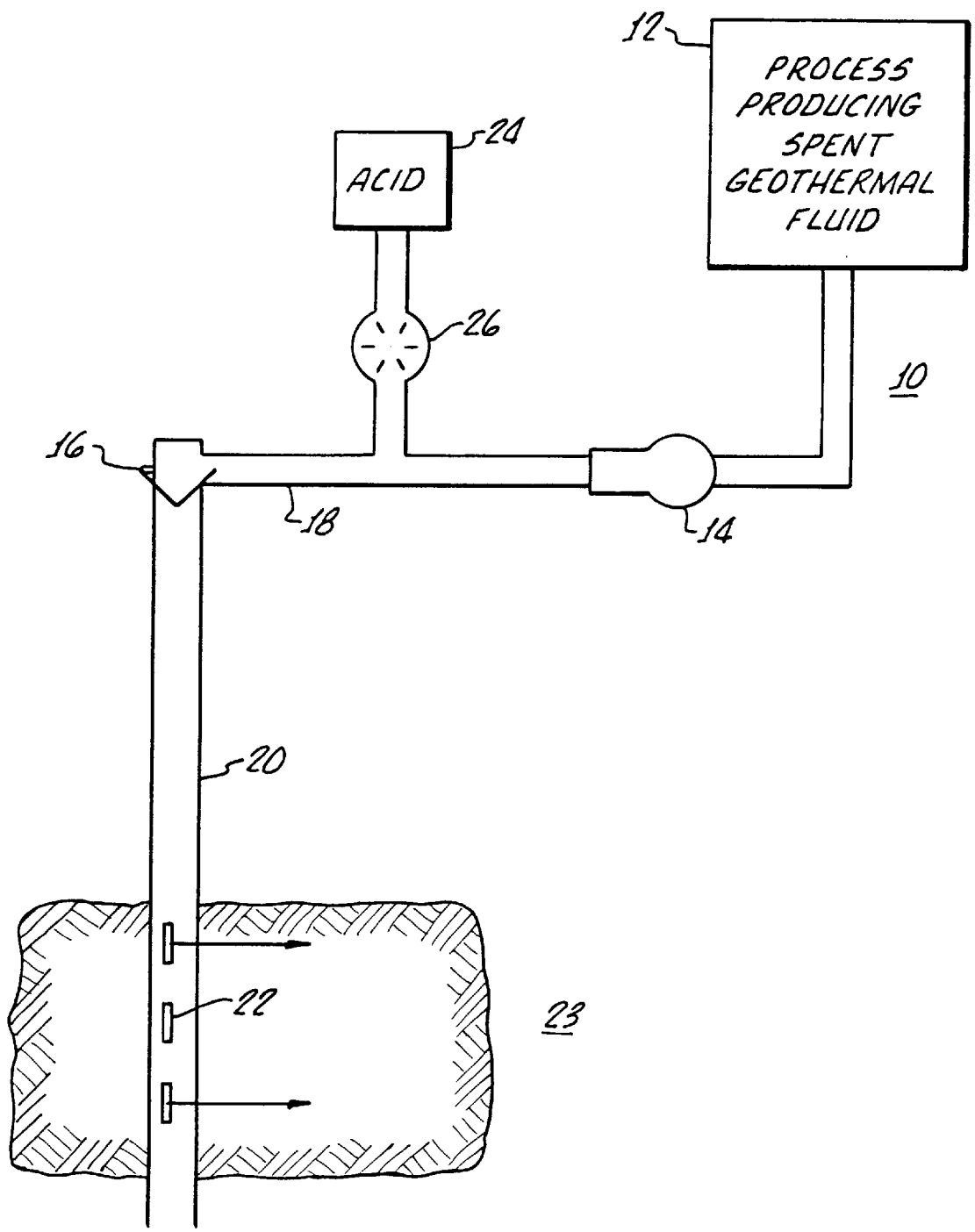

SLOW ACIDIZING OF GEOLOGICAL FORMATIONS

FIELD OF THE INVENTION

This invention relates to a method for mildly acidizing a geothermal well, and more particularly, for increasing the flow rate of a geothermal well.

BACKGROUND

As a geothermal field ages by reason of long term extraction of hot geothermal fluid from geological formations in the field, and long term reinjection of spent heat depleted geothermal fluid into the field, two results often occur: 1) a reduction in the mass flow rate and temperature of hot geothermal fluid from production wells in the field; and 2) an increase in the pressure required to reinject heat depleted, waste or disposable geothermal fluid (i.e., spent geothermal fluid) into injection wells in the field. Both problems apparently result from reduction in the permeability of the geological formations in the field.

Another common problem that often occurs in an operating geothermal field is coupling between an injection well and a production well whereby the heat depleted geothermal fluid pumped into the injection well begins to adversely affect the temperature of the hot geothermal fluid extracted from a nearby production well. The exact mechanism that controls these results is not entirely understood at this time, but it may be that the problems are related to the permeability, or changes in the permeability, of the geological formations in which the wells are located. Such changes apparently are caused by long term extraction of hot geothermal fluid from, and long-term injection of spent geothermal fluid into, the geological formations of a field.

In order to increase the rate at which spent geothermal fluid can be disposed of in an injection well, it is conventional to carry out what is termed "acidizing" the well. Such an approach is also used for increasing the flow rate of geothermal fluid from a production well. This is a procedure by which concentrated acid is applied to a stratum whose location and nature is determined from geological studies for the purpose of increasing the permeability of the stratum by the dissolving action of the acid on the rock in the stratum. The procedure, which is time consuming, costly, and dangerous, requires the injection well to be taken out of operation.

The first step after operation of the injection well is terminated is to place rubber seals in the well at the upper and lower limits of the stratum to be treated. These placements require the use of a rig having drilling pipes for inserting and withdrawing the rubber seals; and usually, a considerable investment in time and labor is involved. Next, a pipe is run down the well from the surface to the upper seal for gaining access to the region of the well between the rubber seals. An acid solution of 10–20% concentration is then pumped through the pipe into the volume between the seals for a period of from 1 to a few hours. Both water and acid must be trucked to the well-head for this purpose; and a considerable volume of liquid is required for this operation. The acid solution percolates through the stratum defined by the seals and dissolves some of the rock therein increasing the permeability of the stratum. Finally, the rubber seals are removed by the rig, and operation can be resumed.

This is a batch approach to increasing the permeability of a stratum. It is expensive because the well being treated must be taken out of operation and testing of the efficacy of the treatment can be done only by closing the well and resuming operations. This results in a tendency to over-treat a well which further increases the cost in money and time.

Recently, geothermal engineers have developed an alternative to the batch approach. A carrier fluid, such as water or a spent geothermal fluid, has been continuously applied to a geothermal well, using (for example) a pump, and concentrated acid has been added to the carrier fluid over days or a few weeks, rather than hours as in the case of a batch process. The concentration of acid in such carrier fluids has been from 0.1% to 10%, which still effects a rather acidic pH of less than 1.55 and can still corrode much of the well hardware. In most instances, corrosion resistant material, e.g., titanium, is inserted into the geothermal well or utilized above ground.

Presently, a need exists to provide a new and improved method of and means for operating and acidizing geothermal wells to selectively modify the permeability of geological formations in which both injection and production wells are located.

SUMMARY OF THE INVENTION

According to the present invention, a carrier fluid, such as spent geothermal fluid, is continuously introduced to a geothermal well located in a geological rock formation and a relatively small amount of acid is continuously added to the carrier fluid to effect an increase in the permeability of the formation. Although the concentration of acid in the carrier fluid is less than 0.1 wt. %, (i.e., less than 0.3 N) and normally in the range from 0.001 wt. % to less than 0.05 wt. %, the concentration is still sufficient to dissolve rock components in the formation to increase permeability over extended treating periods. Normally, this operation will occur over at least three months rather than a few weeks (as in the case of the prior art), and is thus a slow mildly acidizing, continuous process rather than a fast, highly acidic process.

In a preferred embodiment, industrial geothermal processing equipment is operated to extract geothermal energy from geothermal fluid and concurrently reinject mildly acidified, non-corrosive, spent geothermal fluid into the underlying geological rock formation to maintain or improve its permeability.

BRIEF DESCRIPTION OF THE DRAWING

Embodiments of the present invention are described below by way of example and with reference to the accompanying drawing wherein FIG. 1 is a schematic block diagram showing one aspect of the present invention in which an acid is continuously added to a carrier fluid being injected into a geothermal well.

DETAILED DESCRIPTION OF THE INVENTION

In accordance with the invention, the natural flow of a carrier fluid through the various strata of a geological formation in which the well is located, will carry the acid to those portions of the formation susceptible to being dissolved. The integrated effect of the exposure of the rock in the formation to the acid over an extremely long period of time is to slowly increase the permeability of the various strata throughout the entire field in which the carrier fluid flows. This slow acidizing, continuous process, is distinguished from the fast, relatively highly acidic continuous process of the prior art, by not requiring suspension of operation of an injection or reinjection well and by ensuring the long-term application of a mildly acidic solution to whatever strata through which the flow of spent geothermal fluid passes while minimizing corrosion effects. When treatment of an injection well is involved, the long term effect of this approach is to increase the permeability of various strata, thereby decreasing the resistance of the injection well to the flow of spent geothermal fluid in the normal use of the well.

The carrier fluid can be available water, condensate from an industrial geothermal process, or geothermal fluid which is used herein to mean a mostly aqueous geothermal liquid, preferably a geothermal liquid of relatively low salinity, and most preferably a spent geothermal liquid derived from a geothermal liquid of low salinity. However, the geothermal fluid can be steam alone or a mixture of steam and liquid. As used herein, aqueous geothermal fluids and brines having "low salinity" contain less than 50,000 ppmw of total dissolved solids (TDS) whereas "high salinity" brines contain at least 50,000 ppmw of TDS. Preferred low salinity geothermal fluids used in the present invention contain less than about 25,000 ppmw TDS, and most preferably less than about 20,000 ppmw TDS. Highly specific examples of high-enthalpy, low salinity brines, particularly those containing silicon, aluminum, iron and/or calcium components, are found in Bulalo, Tiwi, Leyte (including Tonganan, Malitbog and Mahongandong), Bac-Man, and Palinpinon in the Philippines; Heber and Coso localities in California; Dixie Valley in Nevada, localities in Kyushu, Japan; and more particularly Awibengkok, Silangkitang and other locations in Indonesia.

The acid is preferably added to the carrier fluid before the fluid enters the injection well. However, the acid solution may also be added to the carrier fluid at a predetermined depth in the well consistent with the location of a slotted liner (or other means) in the well through which geothermal fluid would flow into the surrounding rock formations. The term "acid" is used herein to also include an acid precursor which hydrolyses upon contact with water contained in carrier fluid or in the geological formation. The acid, by its dissolving action on the rock, the components resulting from drilling damage, or other components of the geological formation itself, effects an increase in permeability of the geological formation, particularly after at least three months, and most preferably after at least six months of contact time with the formation components.

In contrast to the methods of the prior art, if the carrier fluid/acid mixture, i.e., acidified carrier fluid, is maintained above pH 1.75, preferably above about pH 2, and most preferably above pH 3, then corrosion of injection tubing and casing can be significantly mitigated, even at relatively high temperatures in the carrier fluid, well or formation. Presumably, dissolution of scales, formation minerals, and drilling damage materials may still occur at pH up to above 6 (preferably up to about 5 or even less than 4.5) over time during "slow injection." However, "slow continuous acid injection" stimulation of geothermal wells is conducted with low dosages of acids (strong, weak or precursors) that produce concentrations ranging from about 0.001 to less than 0.1 weight percent (i.e., about 10 to less than 1000 ppmw). Useful strong acids include hydrochloric, perchloric, sulfuric, and nitric acid, with hydrochloric acid being preferred.

In addition to mitigating corrosion, employing such low acid dosages reduces operational costs and the potential for precipitation by-products. Sulfuric acid, in particular, must be used with precaution to avoid by-product, alkaline-earth sulfate precipitation. Prevention of by-product sulfate precipitates at geothermal fields, such as Salak (Indonesia), Bulalo and Tiwi (Philippines), can generally be achieved by employing dosages of 10 to less than 100 ppmw $H_2SO_4$. At higher strong acid dosages, treatment of the carrier fluid with about 1 to about 10 ppmw of commercially-available sulfate scale inhibitors is usually required.

Non-corrosive or less-corrosive acids are preferred for the process of the invention. Relatively weak acids that are useful in well stimulation include acetic, formic, citric, glycolic, sulfurous and HF. (Similar to $H_2SO_4$, HF is also used with precaution to avoid by-product, alkaline-earth fluoride precipitation.) Other stimulation chemicals that fall within the meaning of acid in this specification include those substances that react with carbonaceous, aluminaceous or siliceous materials, including for example, ammonium chloride, ammonium nitrate, sodium citrate, ethylenediaminetetraacetic acid (EDTA) and/or salts thereof, diethylenetriaminepentaacetic acid and/or salts thereof, and pyrocatechol.

Acid precursors that generate acids after contact with water in carrier fluid, thereby mitigating corrosion, include urea-sulfuric acid adduct, preferably urea-hydrochloric acid adduct, and hydrolyzable chlorinated solvents. Unlike the strong acids, these acid precursors can generally be handled without precaution until they hydrolyze. The adducts are available from Entek Corporation, Brea, Calif. Nevertheless, the highly preferred acids for use herein include those that exhibit mild or non-corrosive properties to the metallic hardware of the wells and industrial operating equipment, particularly in a geothermal fluid having a pH in the range between 1.75 and 4.5. Specific examples encompass non-oxidizing acid species such as hydrochloric acid, chloroacetic acid, urea-hydrochloric acid adduct, citric acid, formic acid, carbonic acid, glycolic and other hydroxyacetic acids, ammonium chloride, acetic acid, and the like.

The present invention is applicable to geological formations containing minerals and structure susceptible to reaction with such acids. Although limestone and similar rock, including dolomite rock, and dolomite limestone, or other types of rock including magmatic, volcanic, and sedimentary rock, calcite, and similar minerals, in veins or other formations in rocks, are all likely candidates for the application of the present invention, the invention is especially effective in strata of geological formations containing relatively high weight percentages of acid-soluble rock, such as pyrite and/or calcite. In these targeted formations, such acid-soluble rock comprises at least 7.5, and preferably at least 15 weight percent of the mineral components of the formation (as measured by conventional core sampling methods). Where the geological rock formations include layers of rock having a relatively low porosity, i.e., less than 10 percent, and preferably less than 5 percent, treatment by the method of the invention is particularly well suited to increase the porosity, and ultimately the permeability of the formation and/or the rate of injectivity of the carrier fluid into the well, i.e., the injectivity.

The injectivity of the treated geothermal well is increased by the method of the invention. Usually the injectivity is increased at least one percent, preferably at least 5 percent, and most preferably at least 10 percent, relative to the injectivity immediately prior to initiating treatment by the invention. Prior to treatment by the invention, the injectivity of such a geothermal well is usually as low as about 0.05 $m^3/hr/kPa$ to about 0.1 $m^3/hr/kPa$. However, after the continuous acidizing treatment of the invention, the injectivity of such geothermal wells is preferably increased to above 0.1 $m^3/hr/kPa$ to about 0.3 $m^3/hr/kPa$.

Referring now to FIG. 1, reference numeral 10 designates an apparatus for adding acid to a carrier fluid, such as spent geothermal fluid, that is pumped into a reinjection well 20 according to the present invention. A source 12 represents the equipment that operates on hot geothermal fluid, extracts heat therefrom, and produces spent geothermal fluid (including heat depleted geothermal fluid that must be disposed). Pump 14 may be provided for pressurizing the spent fluid after such fluid exits source 12 (i.e., downstream of the source of spent geothermal fluid) but before the fluid is delivered to well-head 16 via pipe 18. Such fluid is applied to reinjection well 20 at a pressure sufficient to force the fluid down the well and through the openings in slotted liner 22 that constitutes the lower portion of the well. The fluid that exits the well enters into and flows through permeable rock in the geological formation 23 in which the well is located until the pressure is dissipated.

As the well ages, the permeability of the rock formations apparently decrease, perhaps due to the precipitation of the mineral rich fluid which is cooled by contact with the geological rock formations. Furthermore, the permeability of the rock formations surrounding the well may be initially insufficient. In any event, experience has shown that injection pressure must be increased with time to maintain the same mass flow of fluid. An approach to ameliorating this problem is shown in FIG. 1 wherein acid, preferably hydrochloric acid, in source 24 is metered at 26 into the flow of carrier fluid) in pipe 18 such that the concentration of acid in the fluid is in the range from about 0.001 to less than 0.1 weight percent. Alternatively, the acid can be injected directly into reinjection well 20. Preferably, the concentration does not exceed about 0.05 weight percent (e.g., a pH greater than about 1.75), but usually exceeds about 0.008 weight percent (e.g., a pH less than about 4.5).

As a consequence, the spent geothermal fluid carrying the dilute acid flows through slotted liner 22 along its usual paths into the rock formation surrounding the well. Wherever dissolvable rock is encountered in these paths, the dilute acid reacts with the rock increasing its permeability.

The injection well may be treated with the acid/carrier fluid at or shortly after start-up of the process; however, some injection wells may be operated without acid/carrier fluid for anywhere from 3 months to 24 months before the onset of acid/carrier fluid injection into the injection well.

The treatment continues over a period of time of at least three months, frequently at least 6 months, nine months or one year, as the acid slowly but effectively continues to dissolve rock (or other formation components) in the flow path of the fluid. The effect on the surrounding rock formations is the integration over a long period of time of highly diluted acid acting on the rock. Eventually, the permeability of the rock will be sufficiently increased to result in a reduction in the pressure needed in order to dispose of the spent geothermal fluid.

The actual amount of time will, of course, depend on the nature of the geological formation in which the well is located; but it is presently contemplated that a time period in excess of 3 months will be required, and usually at least 6 months up to about 1 year. In this sense, the present invention involves a continuous treatment of the entire well without interrupting its operation for extended time periods, as distinguished from (1) the batch process that involves shutting down the well and acidizing only a preselected stratum for only a few hours, or from (2) a continuous process utilizing relatively strong acid concentrations for a week or only a few weeks (i.e., less than three months).

As used herein, the terms "continuous" or "continuously" refer to uninterrupted operation, but can include inadvertent interruptions or interruptions that are intended to circumvent either the spirit or scope of the invention. In the present invention, operations can be suspended for a few hours to a few weeks and still fall within the continuous nature of the invention, so long as the acidized carrier fluid is added to the formation for a total supply time to the formation of more than three months.

Additionally, the present invention also can be used for developing new geothermal injection or production wells once drilling is completed. The methods shown in FIG. 1 can be used for adding acid solutions, or other suitable chemicals, to spent geothermal fluid diverted from an injection well and forced into the newly drilled well. The fluid carrying the dilute acid will flow into rock formations surrounding the well, and the dilute acid will react with the formation, thus increasing the permeability. Subsequently, at the end of the treatment period, operation of the well as an injection or production well, as the case may be, can be commenced.

At present, it is contemplated that the present invention will be carried out to change the permeability of rock formations at depths ranging from 100–3000 meters (m). Although the invention can be used for changing the permeability of rock formations at any depth, the preferred depth for treatment by the present invention is 200 to 2000 m.

The present invention also involves a method for increasing flow from a production well, preferably a well whose production can be terminated for more than 3 months. In such a case, the flow of hot geothermal fluid from the production well is terminated, and carrier fluid, such as spent geothermal fluid, can be diverted from a nearby injection (reinjection) well and forced into the production well. Acid solution is added to the carrier fluid in the manner described above, preferably by piping the acid to the desired depth in the formation. Over a period of at least several months, the highly dilute acid will increase the permeability of the rock formations penetrated by the carrier fluid carrying the highly dilute acid. At the end of the treatment period, production of the well may be resumed with an increased rate of flow.

The invention is further described by the following example which is illustrative of a specific mode of practicing the invention and is not intended as limiting the scope of the invention as defined by the appended claims.

EXAMPLE I

TABLE 1

| Spent Geothermal Brine | |
|---|---|
| Ion | ppmw |
| Na | 4380 |
| K | 943 |
| Ca | 250 |
| Li | 22 |
| Mg | 0.5 |
| Fe | 0.2 |
| Ba | 0.5 |
| Sr | 4 |
| Mn | <0.1 |
| Al | 1 |
| B | 275 |
| Si | 280 |
| Cl | 8090 |
| Br | 27 |
| I | 11 |
| SO4 | 26 |
| All other metals | <0.1 |

In an accelerated treatment of a representative core sample extracted from a geological rock formation of, a brine/carrier fluid described in above Table 1 is mixed with nine different quantities of hydrochloric acid and continuously contacted in separate runs with separate core samples having approximately equal weights. Nine runs are conducted at a temperature of 20° C. and nine at 100° C., for 7 days. The amount of acid maintained in the nine different tested acidized carrier fluids range from 1 down to 0.006 wt. % (i.e., 10,000–60 ppmw acid) in order to maintain constant pH values ranging from 0.65 to 4.89 during the continuous contact period.

The composition of the core sample is described in Table 2.

TABLE 2

Core Sample Composition

| Mineral, composition | wt. % |
|---|---|
| Quartz, SiO$_2$ | 25 |
| Plagioclase, Al-Silicate | 28 |
| Clays, Al-Silicate | 30 |
| Feldspar, Al-Silicate | 2 |
| Calcite, CaCO3 | 10 |
| Pyrite, FeS2 | 5 |
| TOTAL | 100 |
| Acid Soluble (includes pyrite & calcite) | 20 |
| Porosity, % | <5 |

It is noted that the core sample contains at least about 40, and preferably at least about 50 weight percent of aluminum-containing components, usually in the form of aluminosilicates. Also, less than 30 weight percent of non-aluminum-containing, but silicon-containing minerals (e.g., relatively pure silica), are contained in the core sample of the rock formation.

After 7 days of continuous contact of the 18 core samples with the acidized carrier fluids, the weight percentage of core sample dissolution is measured. The data are summarized below in Table 3.

TABLE 3

| | | | Dissolution % | |
|---|---|---|---|---|
| Hcl, wt. % | HCl, ppmw | pH | 20° C. | 100° C. |
| 1 | 10,000 | 0.65 | 8.43 | 24.8 |
| 0.5 | 5,000 | 0.91 | 7.09 | 23.8 |
| 0.25 | 2,500 | 1.17 | 4.77 | 22.3 |
| 0.1 | 1,000 | 1.55 | 2.7 | 15 |
| 0.09 | 900 | 1.61 | 3.43 | 17.8 |
| 0.05 | 500 | 1.92 | 2.38 | 10.7 |
| 0.025 | 250 | 2.34 | 1.76 | 4.6 |
| 0.01 | 100 | 3.46 | 0.07 | 1.1 |
| 0.006 | 60 | 4.89 | 0.04 | 0.09 |

The data indicate that substantial core sample dissolution can still be achieved at a carrier fluid pH greater than 1.55 which is produced from an acid concentration less than 1000 ppmw acid (i.e., less than 0.1 wt. % acid). Although the prior art has implied that acid concentrations in carrier fluids less than 0.5 wt. % and minimally less than 0.1 wt. % are not effective, it has been discovered by the present invention that such is not the case. The data in Table 3 indicate that, even at hydrochloric acid concentrations of the carrier fluid as low as 0.01 wt. % or 0.006 wt. % at pH values from about 3.25 to about 5.00, respectively, core sample dissolution still occurs. It can be readily seen that an acid concentration of more than about 80 ppmw, i.e., a pH less than 4.5, can effectively over time cause geological rock dissolution for increased formation permeability. As the method of the invention is employed for extended periods of time, the skilled artisan can readily determine the time period required to achieve desired geological rock dissolution that provides maintenance or an increase in desired permeability of the formation and/or injectivity of a well.

While the preferred embodiments of the invention have been shown and described, and some alternative embodiments and examples also shown and/or described, changes and modifications may be made thereto without departing from the invention. Accordingly, it is intended to embrace within the invention all such changes, modifications and alternative embodiments as fall within the spirit and scope of the appended claims.

We claim:

1. A method for treating a geothermal well located in a geological rock formation, said method comprising the steps of:
   a) contacting said geological rock formation with an acidified carrier fluid having a concentration of acid in the acidified carrier fluid of less than 0.1 weight percent; and
   b) continuing step a) until an increase in permeability of said geological rock formation is achieved.

2. The method of claim 1 wherein said concentration of said acid in said acidified carrier fluid is about 0.05 weight percent or less.

3. The method of claim 1 wherein said acidified carrier fluid has a pH above about 1.75 and said contacting in step a) occurs for at least 3 months.

4. The method of claim 1 wherein said acidified carrier fluid has a pH above 2.0.

5. The method of claim 1 wherein said acidified carrier fluid has a pH above 3.0.

6. The method of claim 1 wherein said acidified carrier fluid has a pH from about 2.0 to less than 4.5.

7. The method of claim 1 wherein said acid comprises a strong acid selected from the group consisting of sulfuric acid, perchloric, hydrochloric acid and nitric acid.

8. The method of claim 1 wherein said acid comprises a weak acid.

9. The method of claim 1 wherein said acid comprises an acid precursor.

10. The method of claim 1 wherein said contacting occurs continuously for at least 6 months.

11. The method of claim 1 wherein said contacting occurs continuously for at least one year.

12. The method of claim 1 wherein said acid is added to a carrier fluid at a location downstream from a source of spent geothermal fluid.

13. The method of claim 1 wherein said concentration of said acid in said acidified carrier fluid is 0.001 weight percent or less.

14. The method of claim 1 wherein said acidified carrier fluid comprises a geothermal fluid.

15. The method of claim 1 wherein said acidified carrier fluid comprises a geothermal fluid having low salinity.

16. The method of claim 1 wherein said acidified carrier fluid comprises a geothermal fluid having a temperature from about 20° C. to about 150° C., calculated at normal pressures.

17. The method of claim 1 wherein said concentration of acid comprises about 0.01 weight percent or less sulfate-containing acid.

18. The method of claim 1 wherein said concentration of acid comprises about 0.001 weight percent or less sulfate-containing acid.

19. A method for treating a geothermal well located in a geological rock formation, said method comprising the steps of:
   a) adding acid comprising a non-oxidizing acid species to a carrier fluid to produce an acidified carrier fluid having a concentration of said acid less than 0.1 weight percent but sufficient to increase the permeability of said geological rock formation; and b) continuously contacting said acidified carrier fluid with said geological rock formation for at least three months until an increase in permeability is achieved.

20. The method of claim 19 wherein said concentration of said acid in said acidified carrier fluid is about 0.05 weight percent or less.

21. The method of claim 19 wherein said acidified carrier fluid has a pH above about 1.75.

22. The method of claim 26 wherein said acidified carrier fluid has a pH above 2.0.

23. The method of claim 19 wherein said acidified carrier fluid has a pH above 3.0.

24. The method of claim 19 wherein said acidified carrier fluid has a pH from about 2.0 to less than 4.5.

25. The method of claim 19 wherein said acid comprises hydrochloric acid.

26. The method of claim 19 wherein said acid is selected from the group consisting of urea-hydrochloric acid, chloroacetic acid, acetic acid, ammonium chloride, citric acid, formic acid, carbonic acid, glycolic acids and hydrolyzable chlorinated solvents.

27. The method of claim 19 wherein said contacting occurs continuously for at least 6 months.

28. The method of claim 19 wherein said contacting occurs continuously for at least one year.

29. The method of claim 19 wherein step a) occurs between said geothermal well and the last heat extraction step of a process in which geothermal energy is extracted from a geothermal fluid.

30. The method of claim 19 wherein said concentration of said acid in said acidified carrier fluid is about 0.001 weight percent or less.

31. The method of claim 19 wherein said carrier fluid comprises a geothermal fluid.

32. The method of claim 19 wherein said carrier fluid comprises a geothermal fluid having low salinity.

33. The method of claim 19 wherein said carrier fluid comprises a geothermal fluid having a temperature from about 20° C. to about 150° C., calculated at normal pressures.

34. The method of claim 19 wherein said concentration of acid comprises about 0.01 weight percent or less sulfate-containing acid.

35. The method of claim 26 wherein the concentration of acid comprises about 0.001 weight percent or less sulfate-containing acid.

36. A method for treating a geothermal well located in a geological rock formation, the method comprising the steps of:

a) contacting the geological rock formation with an acidified carrier fluid having a concentration of acid in the acidified carrier fluid of 0.001 weight percent or less; and b) continuing step a) until an increase in permeability of the geological rock formation is achieved, where the acid is selected from the group consisting of hydrochloric acid, sulfuric acid, and mixtures thereof.

* * * * *

UNITED STATES PATENT AND TRADEMARK OFFICE
CERTIFICATE OF CORRECTION

PATENT NO. : 5,979,556
DATED : November 9, 1999
INVENTOR(S) : Darrell L. Gallup et al.

It is certified that error appears in the above-indentified patent and that said Letters Patent is hereby corrected as shown below:

Column 6, line 61, after "formation" delete "of".

Column 9, line 11, (claim 22), after "claim" delete "26" and insert -- 19 --.

Column 10, line 15, (claim 35), after "claim" delete "26" and insert -- 19 --.

Signed and Sealed this

Tenth Day of April, 2001

Attest:

NICHOLAS P. GODICI

Attesting Officer

Acting Director of the United States Patent and Trademark Office